(12) United States Patent
Siren et al.

(10) Patent No.: US 11,320,299 B2
(45) Date of Patent: May 3, 2022

(54) METHOD FOR DETERMINING THE MASS AND THE CENTRE OF MASS OF A DEMOUNTABLE PLATFORM

(71) Applicant: HIAB AB, Kista (SE)

(72) Inventors: Pasi Siren, Kirjala (FI); Mikko Huova, Tampere (FI); Lauri Siivonen, Suinula (FI)

(73) Assignee: HIAB AB, Kista (SE)

( * ) Notice: Subject to any disclaimer, the term of this patent is extended or adjusted under 35 U.S.C. 154(b) by 104 days.

(21) Appl. No.: 16/575,559

(22) Filed: Sep. 19, 2019

(65) Prior Publication Data

US 2020/0096381 A1 Mar. 26, 2020

(30) Foreign Application Priority Data

Sep. 20, 2018 (EP) .................................... 18195708

(51) Int. Cl.
| | |
|---|---|
| *G01G 23/01* | (2006.01) |
| *G01G 19/10* | (2006.01) |
| *B60P 1/64* | (2006.01) |
| *B65D 88/12* | (2006.01) |
| *G01G 19/02* | (2006.01) |
| *G01G 21/28* | (2006.01) |
| *G01G 19/12* | (2006.01) |

(52) U.S. Cl.
CPC ........... *G01G 19/02* (2013.01); *B65D 88/123* (2013.01); *G01G 19/10* (2013.01); *G01G 21/28* (2013.01); *G01G 23/01* (2013.01); *B60P 1/6463* (2013.01); *G01G 19/12* (2013.01)

(58) Field of Classification Search
CPC ........ G01G 23/01; G01G 19/02; G01G 21/28; G01G 19/10; G01G 19/12; G01G 19/083; B65D 88/123; B60P 1/6463
See application file for complete search history.

(56) References Cited

U.S. PATENT DOCUMENTS

| 3,857,452 | A | * | 12/1974 | Hartman | ................. | G01G 19/12 |
| | | | | | | 177/139 |
| 3,971,451 | A | * | 7/1976 | Norberg | ................. | G01G 19/08 |
| | | | | | | 177/1 |
| 4,347,903 | A | | 9/1982 | Yano | | |
| 5,070,953 | A | * | 12/1991 | Kyrtsos | ................... | E02F 9/264 |
| | | | | | | 177/25.14 |
| 5,290,138 | A | | 3/1994 | Smart | | |

(Continued)

FOREIGN PATENT DOCUMENTS

| DE | 4140344 A1 | 6/1993 |
| EP | 1702792 A2 | 5/2011 |

(Continued)

OTHER PUBLICATIONS

European Search Report for EP Application No. 18 19 5700 dated Mar. 6, 2019 (2 pages).

(Continued)

*Primary Examiner* — Randy W Gibson
(74) *Attorney, Agent, or Firm* — Merchant & Gould P.C.

(57) ABSTRACT

The present invention relates to a method for determining the mass and the centre of mass of a demountable platform by using a mathematical model, the parameters of which are estimated using an iterative procedure.

13 Claims, 3 Drawing Sheets

(56) References Cited

U.S. PATENT DOCUMENTS

| | | | | |
|---|---|---|---|---|
| 5,509,293 | A * | 4/1996 | Karumanchi | G01G 19/10 177/139 |
| 5,601,393 | A * | 2/1997 | Waldschmitt | B60P 1/16 414/471 |
| 5,929,389 | A * | 7/1999 | Keuper | G01G 19/083 177/141 |
| 6,703,569 | B2 * | 3/2004 | Moore | G01G 19/083 177/136 |
| 8,716,609 | B2 * | 5/2014 | Pangrazio | G01G 19/08 177/136 |
| 9,534,948 | B2 * | 1/2017 | Lustenberger | G01G 19/12 |
| 10,583,766 | B2 * | 3/2020 | Baldys | B60P 1/162 |
| 10,955,286 | B2 * | 3/2021 | Kivi | G01G 23/01 |
| 2010/0161185 | A1 * | 6/2010 | Marathe | E02F 9/264 701/50 |
| 2011/0196623 | A1 * | 8/2011 | Hakkinen | G01M 1/122 702/41 |
| 2013/0062127 | A1 * | 3/2013 | Pangrazio | G01G 19/08 177/1 |
| 2014/0069728 | A1 | 3/2014 | Lustenberger | |
| 2016/0116328 | A1 * | 4/2016 | Kivi | B66C 13/16 702/101 |
| 2018/0056841 | A1 * | 3/2018 | Baldys | G01G 19/10 |
| 2020/0096381 | A1 | 3/2020 | Siren | |
| 2020/0096383 | A1 * | 3/2020 | Siren | G01G 19/10 |

FOREIGN PATENT DOCUMENTS

| | | |
|---|---|---|
| EP | 3141420 A1 | 10/2019 |
| GB | 2461273 A | 12/2009 |
| JP | 408233640 A | 9/1996 |
| WO | 2008028993 A1 | 3/2008 |

OTHER PUBLICATIONS

European Search Report for EP Application No. 18 19 5702 dated Feb. 21, 2019 (2 pages).

European Search Report for EP Application No. 18 19 5708 dated Mar. 8, 2019 (2 pages).

* cited by examiner

METHOD FOR DETERMINING THE MASS AND THE CENTRE OF MASS OF A DEMOUNTABLE PLATFORM

PRIORITY

This application claims priority of the European patent application number 18195708.5 filed on Sep. 20, 2018 the contents of which are fully incorporated herein by reference.

TECHNICAL FIELD OF THE INVENTION

The present invention relates to a method for determining the mass and the centre of mass of a demountable platform according to the preamble of the appended independent claim.

BACKGROUND OF THE INVENTION

Hooklifts are widely used in vehicles, such as trucks to quickly and easily handle demountable platforms. Hooklifts can perform several work tasks, such as loading, unloading, tipping and lowering of demountable platforms.

Hooklifts are known which can determine the mass of a demountable platform. An example of such a hooklift comprises moveable weight sensors. With this hooklift the demountable platform is weighted by lifting off the demountable platform from the chassis of the vehicle, moving the moveable weight sensors under the demountable platform and then lowering the demountable platform on the moveable weight sensors to be weighted.

A problem associated with the above and other known hooklifts provided with a weighing system is that the demountable platform must be lifted onto the vehicle before it can be weighted. Another problem associated with the known hooklifts is that weight sensors are needed in determining the mass of the demountable platform. Still another problem associated with the known hooklifts is that the weighing of the demountable platform is time-consuming.

SUMMARY OF THE INVENTION

It is the main objective of the present invention to reduce or even eliminate the prior art problems presented above.

It is an objective of the present invention to provide a method for weighing a demountable platform. In more detail, it is an objective of the present invention to provide a method enabling to determine the mass and the centre of mass of a demountable platform without using weight sensors. It is also an objective of the invention to provide a method enabling to quickly, easily and accurately determine the mass and the centre of mass of a demountable platform.

In order to realise the above-mentioned objectives, the method according to the invention is characterised by what is presented in the characterising portion of the appended independent claim. Advantageous embodiments of the invention are described in the dependent claims.

A method for determining the mass and the centre of mass of a demountable platform according to the invention comprises:
using a hooklift to lift the demountable platform from the ground onto a vehicle,
measuring, during the lifting of the demountable platform, a physical quantity that varies as a function of the movement of the hooklift,
determining, at predetermined values of the physical quantity, values of the load force of a main cylinder of the hooklift,
providing a mathematical model of the load force of the main cylinder as a function of the physical quantity, the mathematical model comprising a set of constants related to the physical dimensions of the hooklift, a first parameter for the mass of the demountable platform, a second parameter for the longitudinal position of the centre of mass of the demountable platform and a third parameter for the vertical position of the centre of mass of the demountable platform,
setting initial values for the parameters,
calculating with the mathematical model the values of the load force at the predetermined values of the physical quantity,
calculating a difference between the determined and calculated values of the load force,
if the difference is larger than a predetermined threshold, repeating the following steps until the difference becomes smaller than the predetermined threshold:
changing at least one of the values of the parameters,
recalculating with the mathematical model the values of the load force at the predetermined values of the physical quantity, and
recalculating the difference between the determined and calculated values of the load force;
selecting the value of the first parameter as the mass of the demountable platform, the value of the second parameter as the longitudinal position of the centre of mass of the demountable platform, and the value of the third parameter as the vertical position of the centre of mass of the demountable platform.

The method according to the invention is based on determining the mass and the centre of mass of a demountable platform by using a mathematical model, the parameters of which are estimated using an iterative procedure. The mathematical model defines the load force of a main cylinder of the hooklift as a function of a physical quantity that varies as a function of the movement of the hooklift, and it comprises parameters for the mass, and the longitudinal and vertical positions of the centre of mass of the demountable platform. The physical quantity can be any physical quantity that varies during the lifting of the demountable platform. The physical quantity can be, for example, the rotation angle of a part of the hooklift or the position of a piston rod of the main cylinder.

In the method according to the invention, the demountable platform is lifted with the hooklift from the ground onto the vehicle. During the lifting of the demountable platform, a physical quantity that varies as a function of the movement of the hooklift is measured, and at predetermined values of the physical quantity, values of the load force of the main cylinder, i.e. the force acting on the main cylinder, are determined. The values of the load force can be determined, for example, based on the pressures in a bottom chamber and a piston rod chamber of the main cylinder, or based on the strain in the main cylinder. The number of the values of the load force that are determined during the lifting of the demountable platform can be, for example, a few tens or a few hundreds. The number of the values of the load force can be, for example, 10-50, 50-100, 100-200, 50-1000 or 20-5000.

In the method according to the invention, the mathematical model is used to calculate the values of the load force at the same predetermined values of the physical quantity where the values of the load force were determined during the lifting of the demountable platform. Before the calculation, initial values are set for the mass and the centre of mass parameters in the mathematical model. For example, the mass parameter can have an initial value of half of the maximum capacity of the hooklift. The middle point of the demountable platform in its longitudinal direction can be used as the initial longitudinal position of the centre of mass, and the middle point of the demountable platform in its vertical (height) direction can be used as the initial vertical position of the centre of mass. The origin of the coordinate system based on which the locations of the longitudinal and vertical positions of the centre of mass are defined can be located, for example, in one of the corners in the front end of the demountable platform.

In the method according to the invention, the quality of the parameters in the mathematical model is estimated by calculating a difference between the determined and calculated values of the load force. The calculation of the difference can be based, for example, on the sum of absolute differences of the determined and calculated values. The sum of absolute differences is calculated by first determining the absolute differences of the corresponding elements in the determined and calculated load force vectors and then summing the absolute differences together.

If the difference is larger than a predetermined threshold, then the steps of changing at least one of the values of the parameters, recalculating with the mathematical model the values of the load force at the predetermined values of the physical quantity, and recalculating the difference between the determined and calculated values of the load force are repeated until the difference becomes smaller than the predetermined threshold. After the iteration procedure has ended, the mass and the centre of mass of the demountable platform can be obtained from the parameters of the mathematical model.

The values of the load force can be determined at any phase of the lifting. Preferably, however, the values of the load force are determined in a first phase and in a second phase of the lifting. In the first phase of the lifting, the front end of the demountable platform is lifted from the ground to a position where the demountable platform comes into contact with the rear rollers of the hooklift. In the first phase, the vehicle rolls under the demountable platform and/or the back end of the demountable platform slides against the ground. In the second phase of the lifting, the demountable platform is off the ground and supported by the rear rollers and the hooklift places the demountable platform onto the vehicle.

The weighing of the demountable platform can be based on measuring the load force of the main cylinder at both above-mentioned phases of the lifting. The determined values of the load force can be stored and processed as two data vectors. The data vectors can both contain, for example, 50-100 elements. Data vector elements can be stored, for example, at the predetermined rotation angles for a predetermined angle range. Preferably, the angle range to be stored is selected so that the phases of the lifting that include dynamic loading, such as the start and the end of the lifting, remain outside of the stored data. Measuring and storing of data vectors occurs in real-time during lifting. The rest of the algorithm can be performed when the lifting event has ended, without hard real-time requirements.

The calculation of the mass and the centre of mass of the demountable platform can be implemented in hardware, software, or a combination of hardware and software components. Hardware components may comprise a processor for processing data and a storage medium for storing the data. Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be executed by a processor. Components may be implemented separately in multiple modules or together in a single module.

The method according to the invention can be applied in a hooklift that is attached to a vehicle, such as a truck, for handling a demountable platform. Such a hooklift comprises a tipping frame, which is connected through a tipping joint to a subframe of the hooklift. The tipping frame is arranged to be moved relative to the subframe by one or more main cylinders, which can be, for example, double-acting differential cylinders. The main cylinder(s) of the hooklift is(are) controlled with a hydraulic system. The bottom side of the main cylinder is attached to the subframe and the piston rod of the main cylinder is attached to the tipping frame. The subframe is attached to a chassis of the vehicle.

The tipping frame of the hooklift comprises a sliding frame, a middle frame and a rear frame. The sliding frame comprises a hook with which the hooklift can releasably attach to the demountable platform. The sliding frame is connected to the middle frame in such a manner that part of the sliding frame is arranged inside the middle frame, and that the sliding frame can be moved relative to the middle frame. The middle frame is connected to the rear frame through a middle frame joint, and the rear frame is connected to the subframe through the tipping joint.

The hooklift comprises a lock for locking the rear frame in parallel with the subframe when the hooklift is used to load the demountable platform from the ground onto the vehicle or to unload the demountable platform from the vehicle onto the ground. The hooklift comprises rear rollers that are mounted close to the tipping joint enabling the demountable platform to be easily moved with the hooklift during the loading and unloading of the demountable platform. Supporting beams provided to the underside of the demountable platform are intended to rest on the rear rollers. The hooklift comprises another lock for locking the middle frame in a parallel direction with the rear frame when the demountable platform is tipped. The hooklift may also comprise locks for locking the demountable platform to the hooklift when the demountable platform is transported by the vehicle.

The lifting of the demountable platform from the ground onto the vehicle can be done by locking the rear frame to the subframe and rotating with the main cylinder(s) the middle frame around the middle frame joint into a position where the hook can attach the demountable platform as the vehicle is reversed towards the demountable platform. After the hook is attached to the demountable platform, the middle frame is rotated by driving the main cylinder(s) inwards. As a result, the front end of the demountable platform rises off the ground. After a certain time, the demountable platform comes into contact with the rear rollers and also the back end of the demountable platform rises off the ground. The demountable platform is now supported by the hook and the rear rollers. The middle frame is rotated until it is essentially parallel with the rear frame. The position of the demountable platform on the tipping frame can be adjusted by moving the sliding frame relative to the middle frame.

An advantage of the method according to the invention is that the mass and the centre of mass of a demountable platform can be determined during the lifting of the demountable platform. Another advantage of the method according to the invention is that the mass and the centre of mass of a demountable platform can be determined without any weight sensors. Still another advantage of the method according to the invention is that it enables to quickly, easily and accurately determine the mass and the centre of mass of a demountable platform.

The mathematical model can be implemented in many ways, such as with a DH parameter definition. In the practical implementation a modelled mechanism transmission ratio can be utilized.

According to an embodiment of the invention the mathematical model is represented by an equation:

$$F_{cylinder} = R(p, x_{cm}, y_{cm}, k_1, \ldots, k_n)mg,$$

where R is a set of values of the transmission ratio parameter, p is a set of values of the physical quantity, $x_{cm}$ is the longitudinal position of the centre of mass of the demountable platform, $y_{cm}$ is the vertical position of the centre of mass of the demountable platform, $k_1$ to $k_n$ are the constants related to the physical dimensions of the hooklift, m is the mass of the demountable platform and g is the acceleration of gravity.

The transmission ratio R reflects the transmission ratio of the movement of the centre of mass of the demountable platform in the direction of the y-axis (i.e. vertical direction) to the movement of the piston of the main cylinder. In practice, the mathematical model reflects, how large load force the main cylinder sees, when the mass and the centre of mass of the demountable platform are known. The transmission ratio R changes as a function of the physical quantity, which can be, for example, the rotation angle α of a part of the hooklift or the position r of a piston rod of the main cylinder.

An increase in the potential energy of the demountable platform during the lifting causes a load force to the main cylinder, which load force is modelled in the mathematical model. In the first phase of the lifting, the potential energy increases as the demountable platform rotates as supported by its rear edge. In the second phase of the lifting, the potential energy changes due to two reasons: the demountable platform rotates and simultaneously moves supported on the rear rollers.

A significant part of the load force of the main cylinder is caused by other, secondary, sources, which can be taken into account separately. The aim of the calibration is to model the secondary load force sources as precisely as possible, so that they do not impair the weighing result. The effect of the frictions of the empty hooklift and the mass of the empty hook can be compensated with a separate calibration and the forces caused by the frictions in different steps can be removed according to the friction model(s). The parameters of the friction model(s) can be determined with a separate calibration.

According to an embodiment of the invention the method comprises, before the step of calculating a difference between the determined and calculated values of the load force, modifying the determined values of the load force by subtracting from them the values of the load force determined for the hooklift without the demountable platform.

The mass of the empty hook during lifting, and the friction force, when the only load is the mass of the empty hook (including the friction of the main joint and the seal friction of the main cylinder) can be taken into account by measuring the load force of the main cylinder, when the hook is lifted without a demountable platform. The data vector is stored, and in a weighing situation, the load data vector of the empty hook is subtracted element by element from the measured load force data vector. The load force data vector of the lifting of the empty hook can be stored in two parts, separately for the first phase and the second phase of the lifting. The calibration lifting of the empty hook can be repeated, for example, once a month, so that the seal and joint friction, which change over time, can be better taken into account.

In addition to the modelled force, the increase in the friction force compared to the empty hooklift can be taken into account. The friction force can be modelled separately for the first and second phase of the lifting.

According to an embodiment of the invention the mathematical model comprises, for a first phase of the lifting of the demountable platform, the friction force represented by an equation:

$$F_{fric\_ground} = F_{a\_ground} + mk_{ground}(x_{cm}/l),$$

where $F_{a\_ground}$ is the constant friction force, m is the mass of the demountable platform, $k_{ground}$ is the friction parameter, $x_{cm}$ is the longitudinal position of the centre of mass of the demountable platform and l is the length of the demountable platform.

The constant friction force $F_{a\_ground}$ is caused by the rolling resistance of the vehicle when unloaded. The rolling resistance of the vehicle and the friction of the main cylinder increase, when the mass of the demountable platform increases, or the centre of mass of the demountable platform moves toward the front end of the demountable platform. This is taken into account with the friction parameter $k_{ground}$.

The constant friction force $F_{a\_ground}$ can be determined by doing a cable pull at the installation site of the hooklift. One end of the cable is attached at a height of about 1.5 meters to a "fixed object", such as to a loop in a building's wall or to a gripping arch of a heavy demountable platform. The second end of the cable is attached to the hook of the hooklift. Thereafter the first phase of the lifting is run with the hooklift and the load force data vector is stored. The vehicle is allowed to roll backwards, as when the demountable platform is lifted. The parameter $F_{a\_ground}$ is obtained by calculating an average in the difference between the load force data vector of the calibration lifting of the empty hook and the load force data vector of the cable pull for the entire first phase of the lifting.

In addition to the cable pull, a calibration lifting can be done at the hooklift installation site with a heavy demountable platform, the mass and the centre of mass of which are known. The procedure in question is performed as the last of three calibration steps, whereby the load force caused by the empty hook and the rolling resistance of the unloaded vehicle can as a pre-processing be compensated from the measured load force data.

In the first phase of the lifting, the rolling resistance of the vehicle and the friction of the main cylinder increase, when the mass of the demountable platform increases, or the centre of mass of the demountable platform moves toward the front end of the demountable platform. This is taken into account in the friction model with the friction parameter $k_{ground}$. In order to determine the parameter $k_{ground}$, the average of the difference $F_{diff\_ground}$ between the pre-processed load force data vector and the modelled load force data vector is calculated. When the mass and the centre of mass of the calibration demountable platform are known, the friction parameter $k_{ground}$ compensating for the difference between the modelled and measured load force can be determined from the equation:

$$k_{ground} = F_{diff\_ground}/l(mx_{cm}).$$

According to an embodiment of the invention the mathematical model comprises, for a second phase of the lifting of the demountable platform, the friction force represented by an equation:

$$F_{fric\_roll} = mk_{roll},$$

where m is the mass of the demountable platform and $k_{roll}$ is the friction parameter.

In the second phase of the lifting, the demountable platform moves on the rear rollers. It can be assumed that the increase in the friction force is in a direct relationship to the mass of the demountable platform.

A calibration lifting can be done at the hooklift installation site with a heavy demountable platform, the mass and the centre of mass of which are known. The procedure in question is performed as the last of three calibration steps, whereby the load force caused by the empty hook and the rolling resistance of the unloaded vehicle can as a pre-processing be compensated from the measured load force data.

The friction parameter $k_{roll}$ can be determined from the load force data vector measured during the calibration lifting of the heavy demountable platform. As pre-processing, the load force caused by the empty hook is compensated from the data of the second phase of the lifting. The average of the difference $F_{diff\_roll}$ between the pre-processed load force and the load force given by the model is calculated. The friction parameter $k_{roll}$ can be determined from the equation:

$$k_{roll} = F_{diff\_roll}/m.$$

According to an embodiment of the invention the changing of the at least one of the values of the parameters is based on iterating the parameters in two nested loops, wherein in the inner loop the first parameter and the second parameter are varied to find the local minimum, and in the outer loop the third parameter is varied to find the global minimum.

The iteration procedure in the method according to the invention can be based on the hill climbing method. The idea is to form new parameter combinations (m, $x_{cm}$ and $y_{cm}$) around the parameter combination that is best so far, and always move the estimate to the parameter combination, which gives the smallest sum of absolute differences. Thus, the estimate moves one step at a time toward the correct parameter combination.

The iteration can be split into two nested loops: in the inner loop of the iteration $y_{cm}$ is kept constant and a combination of m and $x_{cm}$ is searched for, which gives the smallest sum of absolute differences. In the outer loop of the iteration, two new y-coordinates for the centre of mass $y_{cm}$ are thereafter created. The combinations of m and $x_{cm}$ yielding the smallest sum of absolute differences are again looked for in the new y-coordinates. Finally, a comparison is made to see in which y-coordinate a better fit, i.e. a smaller sum of absolute differences, is found, and the estimate is moved to the y-coordinate in question. The iterations are continued until the sum of absolute differences no longer decreases, whereby the best possible parameter combination (m, $x_{cm}$ and $y_{cm}$), i.e. the weighing result, has been found. In the following, the iteration procedure is presented step by step:

The inner loop:
1) An initial guess is made (m, $x_{cm}$ and $y_{cm}$) and the sum of absolute differences of the data vector is calculated
   a. $y_{cm}$ is assumed as a constant and m and $x_{cm}$ is guessed
2) 4 new points (m and $x_{cm}$) are formed around the guess at a distance of d
   a. d is a relative distance (e.g. 10%) from the entire x-coordinate area (e.g. 1.0-5.0 m) and the mass area (e.g. 1,000 kg-20,000 kg)
3) The sums of absolute differences of the the new points are calculated in relation to the measurement vectors
4) The estimate is moved to the point that gives the smallest sum of absolute differences and the process is continued from point 2
   a. If the original estimate is better than any of the four points, d is halved and the process is continued from point 2
   b. If d<$d_{min}$ (the parameter to be set, e.g. 1%), then the local minimum has been found.

When the local minimum of the mass and mass x-coordinate has been found, the value of the y-coordinate will be changed in the outer loop of the iteration.

The outer loop:
1) New points are formed on the y-axis above and below the previous result (m, $x_{cm}$ local minimum) at a relative distance $d_y$
2) The local minimum of the mass and x-coordinate is again iterated in these, i.e. the inner loop of the iteration is performed
3) The estimate of the y-axis is always moved to the point, where the smallest local minimum of the force error was found
   a. If the original estimate is better than either of the two new local minimums, $d_y$ is halved and the process is continued from point 2 of the outer loop
   b. If $d_y$<$d_{ymin}$, then the global minimum, i.e. the weighing result, has been found.

According to an embodiment of the invention the difference between the determined and calculated values of the load force is calculated as a sum of absolute differences. The sum of absolute differences is calculated by first determining the absolute differences of the corresponding elements in the determined and calculated load force vectors and then summing the absolute differences together. The absolute differences of the elements that were obtained during the second phase of the lifting can be weighted by a weighting function before summing the absolute differences together.

According to an embodiment of the invention the physical quantity is the rotation angle of a part of the hooklift. The part of the hooklift can be, for example, a middle frame, a sliding frame or a hook. The rotation angle of the part of the hooklift can be determined with one or more inclinometers. The rotation angle of the part of the hooklift can mean an angle of the part relative to another part of the hooklift, or a part of the vehicle, or with respect to gravity. For example, the rotation angle of the middle frame can mean the angle between the middle frame and a subframe of the hooklift. When the hooklift begins to lift the demountable platform from the ground, the angle between the middle frame and the subframe is about 120 to 150 degrees. During the lifting process, the angle between the middle frame and the subframe becomes smaller until at the end of the lifting process the angle is about 0 degrees. The values of the load force can be determined during the lifting of the demountable platform, for example, at intervals of 0.1 to 5 degrees or 0.5 to 2 degrees, or at an interval of 1 degree of the rotation angle of the part of the hooklift.

According to an embodiment of the invention the physical quantity is the position of a piston rod of the main cylinder. The position of the piston rod can be determined, for example, with a displacement sensor attached to the main cylinder, or with a non-contact sensor arranged in connection with the main cylinder. Examples of non-contact sensors are optical and electromagnetic sensors. The values of the load force can be determined during the lifting of the demountable platform, for example, at intervals of 0.1 to 5 cm or 0.5 to 2 cm, or at an interval of 1 cm of the position of the piston rod.

According to an embodiment of the invention the values of the load force are determined based on pressures in a bottom chamber and a piston rod chamber of the main cylinder. The pressures in the bottom chamber and the piston rod chamber can be measured with pressure sensors. The load force can be calculated from the chamber pressures by multiplying the pressures with the piston areas in either chamber.

According to an embodiment of the invention the values of the load force are determined based on the strain in the main cylinder. A strain gauge can be arranged to measure, for example, the strain of a piston rod of the main cylinder.

According to an embodiment of the invention the set of constants related to the physical dimensions of the hooklift comprises one or more of the following: horizontal or vertical component of the distance between a main joint and a joint of a piston of the main cylinder, the main joint and a joint of the main cylinder, the main joint and the hook, the main joint and a rear roller, a bottom rear corner of the demountable platform and a gripping arch, the height of the main joint from the ground.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

DETAILED DESCRIPTION OF THE INVENTION

Now, referring to the drawings the invention is described in more details.

Figure 1:
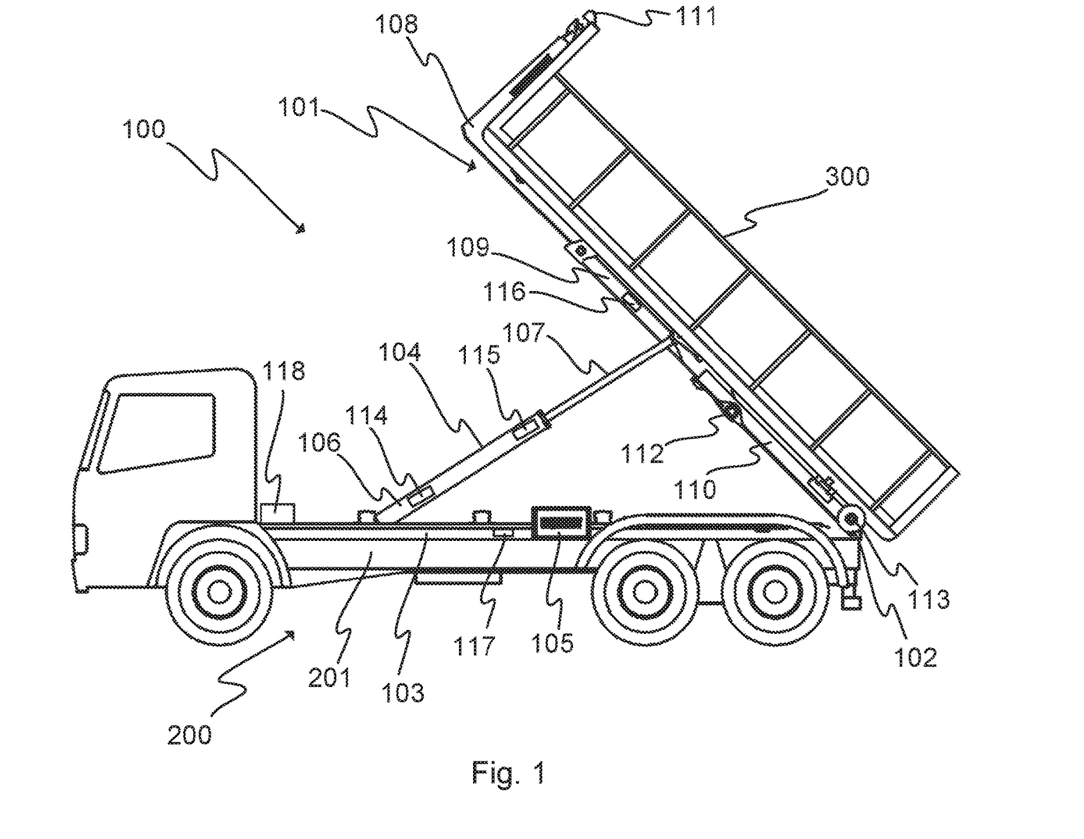
FIG. 1 illustrates an example of a hooklift assembled on a truck.

FIG. 1 illustrates an example of a hooklift 100 that is assembled on a truck 200. The hooklift 100 comprises a tipping frame 101, which is connected through a tipping joint 102 to a subframe 103 of the hooklift 100. The tipping frame 101 is arranged to be moved relative to the subframe 103 by two parallel main cylinders 104, which are controlled with a hydraulic system 105. The bottom sides 106 of the main cylinders 104 are attached to the subframe 103 and the piston rods 107 of the main cylinders 104 are attached to the tipping frame 101. The subframe 103 is attached to a chassis 201 of the truck 200.

The tipping frame 101 comprises a sliding frame 108, a middle frame 109 and a rear frame 110. The sliding frame 108 comprises a hook 111 with which the hooklift 100 is releasably attached to a demountable platform 300. The sliding frame 108 is connected to the middle frame 109 in such a manner that part of the sliding frame 108 is arranged inside the middle frame 109, and that the sliding frame 108 can be moved relative to the middle frame 109. The middle frame 109 is connected to the rear frame 110 through a middle frame joint 112, and the rear frame 110 is connected to the subframe 103 through the tipping joint 102. The hooklift 100 comprises locks (not shown in FIG. 1) with which the relative movement of parts of the hooklift 100 can be prevented. The hooklift 100 also comprises locks (not shown in FIG. 1) for locking the demountable platform 300 to the hooklift 100 when the demountable platform 300 is transported by the truck 200.

During loading of the demountable platform 300 onto the truck 200 and unloading of the demountable platform 300 from the truck 200, the rear frame 110 is locked to the subframe 103, and the middle frame 109 is rotated around the middle frame joint 112 by using the main cylinders 104. Rear rollers 113 that are mounted close to the tipping joint 102 enable the demountable platform 300 to be easily moved with the hooklift 100 during the loading and unloading work tasks. During tipping and lowering of the demountable platform 300, the middle frame 109 is locked in parallel direction with the rear frame 110 (as shown in FIG. 1), and the rear frame 110 is rotated around the tipping joint 102 by using the main cylinders 104. The position of the demountable platform 300 on the tipping frame 101 can be changed by moving the sliding frame 108 relative to the middle frame 109.

The hooklift 100 comprises pressure sensors 114 and 115 for measuring a pressure in a bottom chamber and a piston rod chamber of the main cylinder 104, respectively. The load force of the main cylinder 104 can be determined based on the pressures in the bottom and piston rod chambers.

The hooklift 100 comprises inclinometers 116 and 117, which are attached to the middle frame 109 and the subframe 103, respectively. By using the inclinometers 116 and 117, an angle between the middle frame 109 and the subframe 103 can be determined, which angle varies as a function of the movement of the main cylinder 104.

The hooklift 100 comprises a data processing unit 118 for processing and storing the data received from the pressure sensors 114 and 115, and from the inclinometers 116 and 117. The data processing unit 118 is configured to determine the angle between the middle frame 109 and the subframe 103 based on the signals received from the inclinometers 116 and 117, and to determine, at predetermined values of the angle, values of the load force of the main cylinder 104 of the hooklift 100 based on the signals received from the pressure sensors 114 and 115. The data processing unit 118 is also configured to determine the mass and the centre of mass of the demountable platform 300 by using a mathematical model of the load force of the main cylinder 104, the model having parameters for the mass and the centre of mass of the demountable platform 300, which are estimated using an iterative procedure.

Figure 2A:
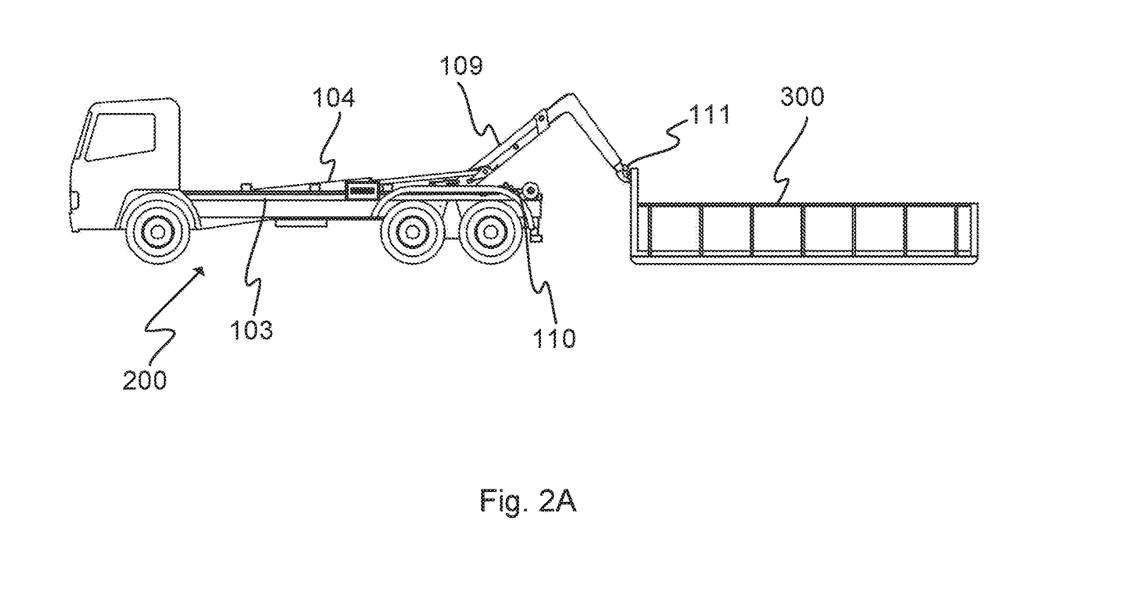
FIGS. 2A-2C illustrate a method according to an embodiment of the invention for determin-ing the mass and the centre of mass of a demountable platform.
Figure 2B:
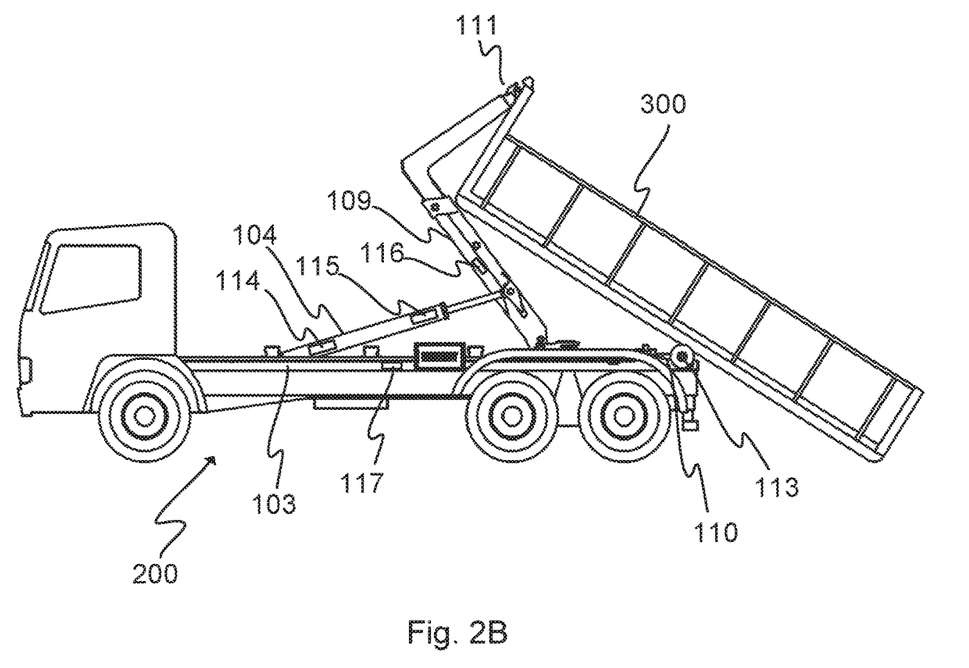
Figure 2C:
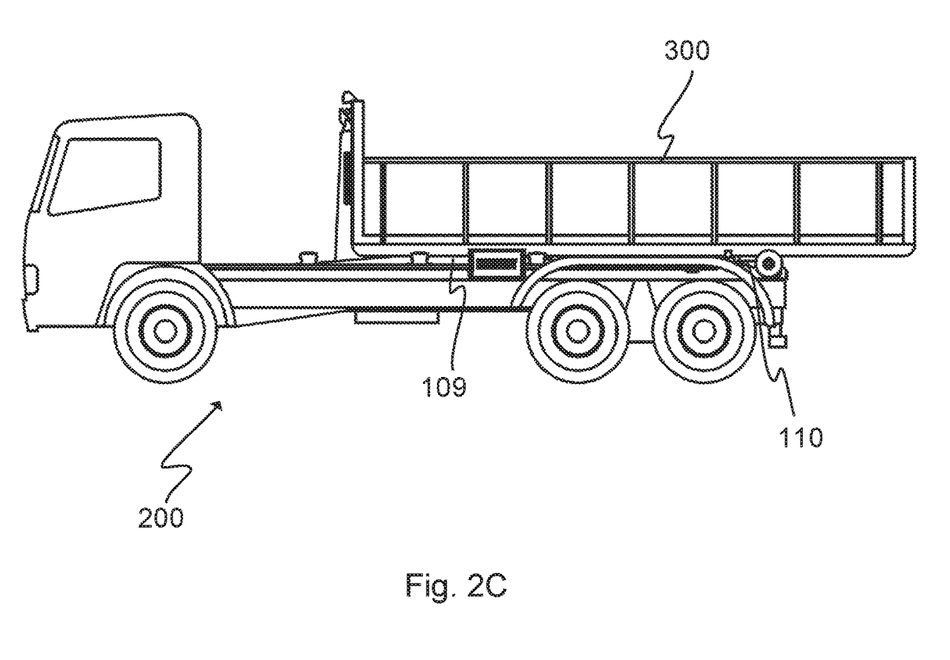
Figure 3:
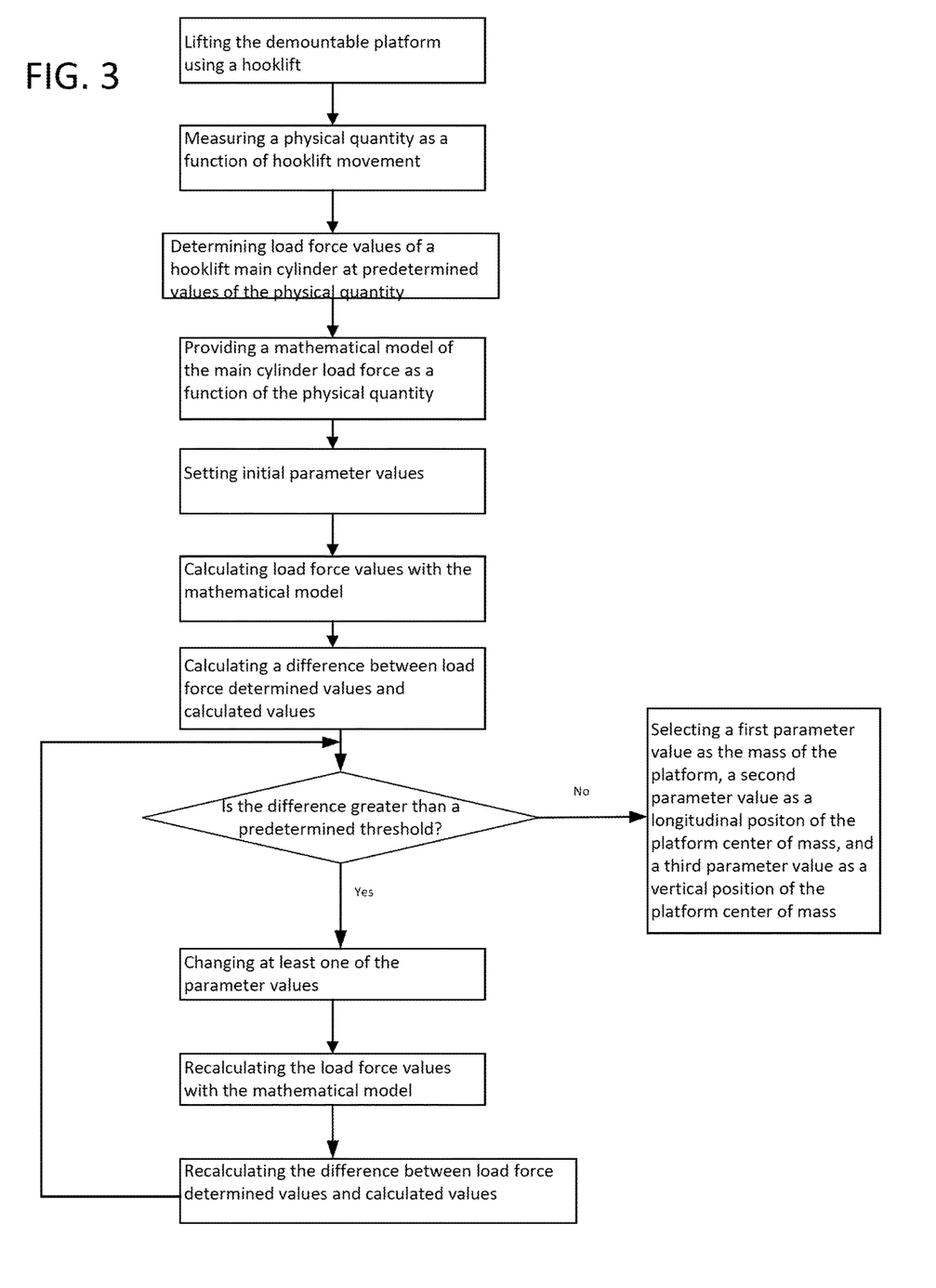
FIG. 3 is a flowchart illustrating a method according to the invention.

FIGS. 2A-2C illustrate a method according to an embodiment of the invention for determining the mass and the centre of mass of the demountable platform 300. In FIG. 2A, there is shown a situation where the truck 200 has been reversed to the demountable platform 300. The middle frame 109 is at an angle that enabled the attachment of the hook 111 to the demountable platform 300.

The lifting of the demountable platform 300 is done by driving the main cylinders 104 inwards. As a result, the middle frame 109 rotates relative to the subframe 103, and the front end of the demountable platform 300 rises off the ground. The rear frame 110 is held locked to the subframe 103 during the lifting of the demountable platform 300.

After a certain time as the lifting of the demountable platform 300 is continued, the demountable platform 300 comes into contact with the rear rollers 113, as shown in FIG. 2B. When the main cylinders 104 are driven further inwards, also the back end of the demountable platform 300 rises off the ground, and the demountable platform 300 becomes supported by the hook 111 and the rear rollers 113. The middle frame 109 is rotated until it becomes essentially parallel with the rear frame 110. The demountable platform 300 rests now on the truck 200, as shown in FIG. 2C.

During the lifting of the demountable platform 300 from the ground onto the truck 200, an angle between the middle frame 109 and the subframe 103 is measured by using the inclinometers 116 and 117. The values of the load force of the main cylinder 104 are determined, at predetermined values of the angle, by measuring with the pressure sensors 114 and 115 pressures in the bottom and piston rod chambers of the main cylinder 104 and then multiplying the pressures with the piston areas in either chamber. The mass and the centre of mass of the demountable platform 300 is then calculated by using the mathematical model of the load force of the main cylinder 104 and the iteration procedure.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A method for determining the mass and the centre of mass of a demountable platform, comprising:
   using a hooklift to lift the demountable platform from the ground onto a vehicle,
   measuring, during the lifting of the demountable platform, a physical quantity that varies as a function of the movement of the hooklift,
   determining, at predetermined values of the physical quantity, values of the load force of a main cylinder of the hooklift,
   providing a mathematical model of the load force of the main cylinder as a function of the physical quantity, the mathematical model comprising a set of constants related to the physical dimensions of the hooklift, a first parameter for the mass of the demountable platform, a second parameter for the longitudinal position of the centre of mass of the demountable platform and a third parameter for the vertical position of the centre of mass of the demountable platform,
   setting initial values for the parameters,
   calculating with the mathematical model the values of the load force at the prede-termined values of the physical quantity,
   calculating a difference between the determined and calculated values of the load force,
   if the difference is larger than a predetermined threshold, repeating the following steps until the difference becomes smaller than the predetermined threshold:
   changing at least one of the values of the first parameter for the mass of the demountable platform, the second parameter for the longitudinal position of the centre of mass of the demountable platform, and the third parameter for the vertical position of the centre of mass of the demountable platform,
   recalculating with the mathematical model the values of the load force at the predetermined values of the physical quantity based on the at least one changed value, and
   recalculating the difference between the determined and recalculated values of the load force;
   selecting the value of the first parameter as the mass of the demountable platform, the value of the second parameter as the longitudinal position of the centre of mass of the demountable platform, and the value of the third parameter as the vertical position of the centre of mass of the demountable platform.

2. The method according to claim 1, wherein the mathematical model is represented by an equation:

$$F_{cylinder} = R(p, X_{cm}, Y_{cm}, k_1, \ldots, k_n) mg,$$

where R is a set of values of the transmission ratio parameter, p is a set of values of the physical quantity, $X_{cm}$ is the longitudinal position of the centre of mass of the demountable platform, $Y_{cm}$ is the vertical position of the centre of mass of the demountable platform, $k_1$ to $k_n$ are the constants related to the physical dimensions of the hooklift, m is the mass of the demountable platform and g is the acceleration of gravity.

3. The method according to claim 1, wherein the method comprises, before the step of calculating a difference between the determined and calculated values of the load force, modifying the determined values of the load force by subtracting from them the values of the load force determined for the hooklift without the demountable platform.

4. The method according to claim 1, wherein the mathematical model comprises, for a first phase of the lifting of the demountable platform, the friction force represented by an $$F_{fric\_ground} = F_{a\_ground} + mk_{ground}(X_{cm}/l),$$

where $F_{a\_ground}$ is the constant friction force, m is the mass of the demountable platform, $k_{ground}$ is the friction parameter, $X_{cm}$ is the longitudinal position of the centre of mass of the demountable platform and l is the length of the demountable platform.

5. The method according to claim 1, wherein the mathematical model comprises, for a second phase of the lifting of the demountable platform, the friction force represented by an equation:

$$F_{fric\_roll} = mk_{roll},$$

where m is the mass of the demountable platform and $k_{roll}$ is the friction parameter.

6. The method according to claim 1, wherein the changing of the at least one of the values of the parameters is based on iterating the parameters in two nested loops, wherein in the inner loop the first parameter and the second parameter are varied to find the local minimum, and in the outer loop the third parameter is varied to find the global minimum.

7. The method according to claim 1, wherein the difference between the determined and calculated values of the load force is calculated as a sum of absolute differences.

8. The method according to claim 1, wherein the physical quantity is the rotation angle of a part of the hooklift.

9. The method according to claim 8, wherein the part of the hooklift is one of the following: a middle frame, a sliding frame or a hook.

10. The method according to claim 1, wherein the physical quantity is the position of a piston rod of the main cylinder.

11. The method according to claim 1, wherein the values of the load force are determined based on pressures in a bottom chamber and a piston rod chamber of the main cylinder.

12. The method according to claim 1, wherein the values of the load force are determined based on the strain in the main cylinder.

13. The method according to claim 1, wherein the set of constants related to the physical dimensions of the hooklift comprises one or more of the following: horizontal or vertical component of the distance between a main joint and a joint of a piston of the main cylinder, the main joint and a joint of the main cylinder, the main joint and the hook, the main joint and a rear roller, a bottom rear corner of the demountable platform and a gripping arch, the height of the main joint from the ground.

* * * * *